United States Patent [19]

Carson

[11] Patent Number: 5,635,119

[45] Date of Patent: Jun. 3, 1997

[54] REACTANT STRATIFICATION METHOD FOR MANUFACTURING ARTICLES MADE OF POLYURETHANE

[76] Inventor: Scott Carson, 22 Monte Vista Dr., Woodland, Calif. 95695

[21] Appl. No.: 699,080

[22] Filed: Aug. 19, 1996

Related U.S. Application Data

[60] Continuation of Ser. No. 451,743, May 26, 1995, abandoned, which is a division of Ser. No. 88,121, Jul. 7, 1993, Pat. No. 5,456,586.

[51] Int. Cl.$^6$ ........................................ B29C 44/02
[52] U.S. Cl. ................ 264/51; 264/314; 264/331.19; 264/338
[58] Field of Search ........................ 264/314, 331.19, 264/45.1, 51, 53, 328.6, 338

[56] References Cited

U.S. PATENT DOCUMENTS

| | | | |
|---|---|---|---|
| 2,923,978 | 2/1960 | Corzine | 15/56 |
| 3,278,658 | 10/1966 | Immel | 264/51 |
| 3,776,683 | 12/1973 | Putzer et al. | 425/440 |
| 3,871,556 | 3/1975 | Breer et al. | 222/132 |
| 4,027,845 | 6/1977 | Pulzer | 249/142 |
| 4,190,697 | 2/1980 | Ahrens | 264/46.6 |
| 4,404,168 | 9/1983 | Baumberger | 422/119 |
| 4,405,681 | 9/1983 | McEvoy | 264/46.6 |
| 4,451,583 | 5/1984 | Chesler | 521/49.5 |
| 4,495,310 | 1/1985 | Dedolph | 521/99 |
| 4,568,003 | 2/1986 | Sperry et al. | 222/145 |
| 4,601,864 | 7/1986 | Vreenegoor | 264/37 |
| 5,164,197 | 11/1992 | Thary | 425/4 R |
| 5,182,313 | 1/1993 | Carson | 521/155 |

FOREIGN PATENT DOCUMENTS

| | | |
|---|---|---|
| 0023749 | 11/1981 | European Pat. Off. .............. 18/8 |
| 2022147 | 11/1971 | Germany . |
| 2050922 | 1/1981 | United Kingdom . |

OTHER PUBLICATIONS

Burwell, J., The "Bunmaster" a New Concept in Discrete Bun Production, Society of Plastic Industry, Inc., Polyurethane Div., Proceedings of the 27th Annual Conference, pp. 129-146 (1981).

*Primary Examiner*—Allan R. Kuhns
*Attorney, Agent, or Firm*—Emch, Schaffer, Schaub & Porcello Co., L.P.A.

[57] ABSTRACT

An apparatus and method for manufacturing articles made of polyurethane that includes a mold assembly in communication with a mix chamber. The mix chamber is positioned below the mold assembly. The mix chamber includes a propeller for mixing the liquid polyurethane chemicals. The mix chamber further includes a pneumatically actuated bladder that causes the mixed chemicals to move from the mix chamber to the mold assembly. The chemicals expand to take on the shape of the mold. The method of the present invention comprises the steps of: (a) selecting polyurethane chemicals having certain specific weights; (b) placing said chemicals in a mix chamber wherein chemicals stratify according to their specific weights to prevent detrimental reaction among the chemicals until final mixing; and (c) allowing the chemicals to expand to form an article.

14 Claims, 2 Drawing Sheets

REACTANT STRATIFICATION METHOD FOR MANUFACTURING ARTICLES MADE OF POLYURETHANE

- This application is a continuation of application Ser. No. 08/451,743, filed on May 26, 1995, now abandoned, which is a divisional of application Ser. No. 08/088,121, filed on Jul. 7, 1993, now U.S. Pat. No. 5,456,586.

BACKGROUND OF THE INVENTION

The present invention is directed to an apparatus and method for manufacturing articles made of polyurethane. More specifically, the invention is directed to an apparatus having a mix chamber positioned below and in direct communication with a mold assembly.

Polyurethane foam has been used for many years for cushioning, insulation and other applications. Polyurethane foam is usually manufactured at atmospheric pressure from polyester or polyether based polyols combined with isocyanates, such as toluenediisocyanate (TDI), polymethylene polyphenylisocyanate (MDI), or mixtures thereof, and additives to form a finished product ranging from a very flexible to a very rigid product. The cell structure of the foam can range from completely open to completely closed. Examples of open cell, flexible polyurethane foam technology are disclosed in U.S. Pat. No. 4,451,583.

Expanded flexible polyurethane articles can be manufactured by the continuous conveyor method or by the molding method. Most expanded flexible polyurethane is currently produced by the continuous conveyor method for producing slabs or by molding articles in a noncontinuous process. The continuous conveyer method or "slab-stock" method is used to process the majority, by weight, of flexible polyurethane foam. In this method, the liquid chemicals are mixed together and poured on a carrier sheet of plastic or paper. The carrier sheet rests either on a conveyor flat floor with two vertical sides or on a conveyor with a round shape. As the chemicals proceed down the conveyor, they rise or expand in the form of closed cells. In the case of open cell foam, as the reacting chemicals reach full expansion, the cell walls open and flow into struts. These struts continue to solidify until an almost cured dry article is formed. At the end of the conveyor, a saw cuts off a length of the article. The article is then taken to a storage area for final curing, which usually takes about 24 hours. This process is continuous until the machine is stopped.

In the alternative molding method, the liquid chemicals are mixed and deposited in a mold, with or without a lid, and the chemicals expand to the shape of the mold. It is important that the chemicals in a mold be mixed in a short interval of time so that the chemicals react properly. One common prior art molding method for large parts is known as the "bucket method". In the bucket method, a mix chamber for mixing the liquid chemicals is located above the interior of a separate mold. The chamber is removed after the mixed chemicals are released in the mold. The chemicals expand and an article is formed in the mold. The bucket method has the disadvantage of being relatively complicated, difficult to clean, and produces foam full of blow holes. Further, the mix chamber in the bucket method is not in direct communication with the mold.

The present invention overcomes the disadvantages of the bucket method while retaining the major bucket method advantage of mixing the chemicals all at once. The mix chamber in the present invention is in direct communication with the mold. The present invention can be used alone to produce polyurethane articles with or without auxiliary blowing agents. It can also be used in a vacuum chamber to eliminate blowing agents as disclosed in my U.S. Pat. No. 5,182,313, the teachings of which are incorporated herein by reference, or a positive pressure chamber depending on the application.

SUMMARY OF THE INVENTION

The present invention is directed to an apparatus and method for manufacturing articles made of polyurethane. The apparatus includes a mold assembly in communication with a mix chamber. The mix chamber is positioned below the mold assembly. The mix chamber includes a propeller for mixing the liquid polyurethane chemicals. The mix chamber further includes a pneumatically actuated bladder that causes the mixed chemicals to move from the mix chamber to the mold assembly. The chemicals react in the mold assembly and expand to take on the shape of the mold. The method of the present invention comprises the steps of: (a) selecting polyurethane chemicals having certain specific weights; (b) placing the chemicals in a mix chamber wherein the chemicals stratify according to their specific weights to prevent detrimental reaction among the chemicals until final mixing; and (c) allowing said chemicals to expand to form an article.

It is the primary object of the present invention to provide an apparatus and method for manufacturing a variety of articles made of polyurethane.

It is an important object of the present invention to provide an apparatus having a mix chamber positioned below and in direct communication with a mold assembly.

Other objects and advantages of the invention will become apparent as the invention is described hereinafter in detail and with reference to the accompanying drawings.

DETAILED DESCRIPTION OF THE PREFERRED EMBODIMENT

Figure 1:
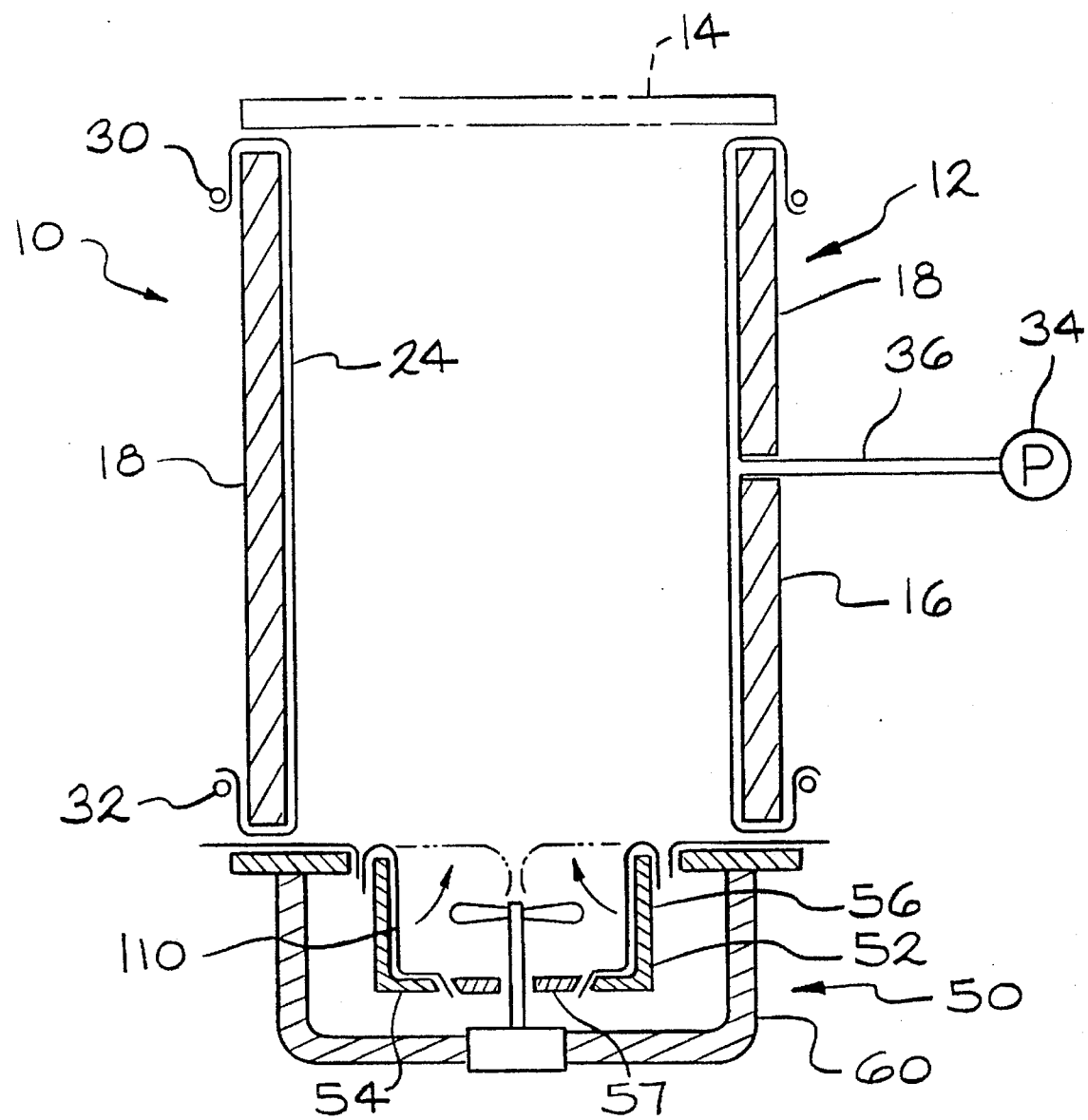
FIG. 1 is a side view of the apparatus of the present invention with the walls of the mold assembly and the mix chamber partially cut away to show the interior of the mold assembly and the mix chamber.

Referring now to the drawings, the apparatus of the present invention is identified by reference numeral 10. The apparatus 10 includes a mold assembly 12. The mold assembly 12, which is preferably made of metal components, includes a top cover 14 and a body 16. In the present embodiment, the body 16 consists of a detachable wall 18 having a cylindrical shape. However, it should be understood that the body 16 can be formed in a variety of shapes and have any number of walls. The mold assembly includes a plastic liner 24 along the interior of the body 16. The liner 24 is fastened to the mold assembly 12 by upper and lower resilient elastic members 30 and 32, respectively, that extend around the exterior surface of the body 16. The plastic liner 24 can be made of a variety of materials with polyethylene, polypropylene and polyvinyl chloride plastics being preferred. The liner 24 has a thickness of approximately 0.025 to 0.25 mm with 0.125 mm being preferred.

The mold assembly includes a pump 34 that is in communication with the interior of the mold assembly body 16 by a conduit 36. The conduit 36 extends through the wall 18.

When the pump 34 is actuated, air that is between the liner 24 and the interior of the body 16 is evacuated thereby creating a vacuum in this space. The vacuum forces the liner to adhere to the interior of the body 16. This results in a smooth molding surface within the mold assembly 12.

Figure 2:
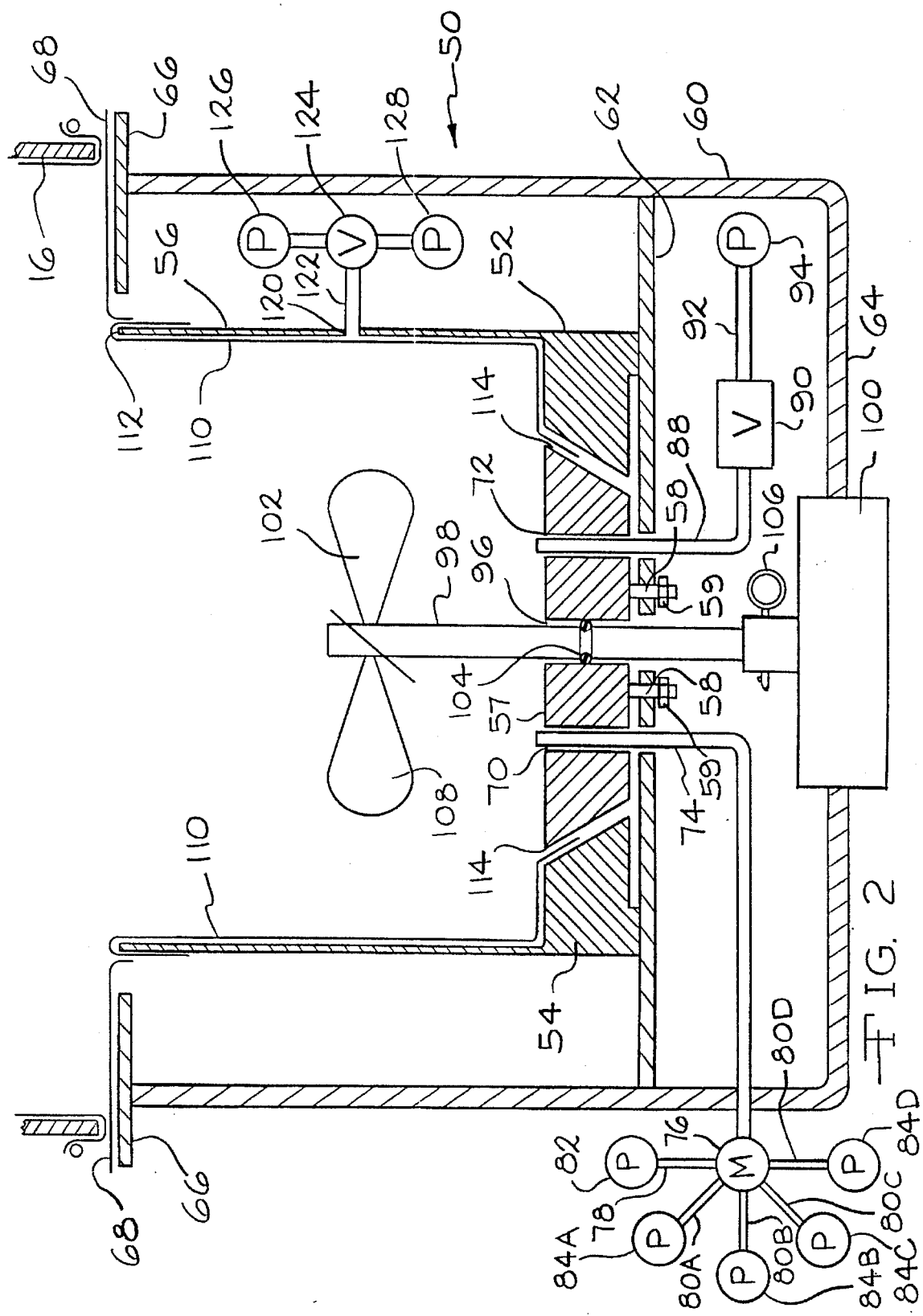
FIG. 2 is a detailed side view of the mix chamber with the walls partially cut away.

The mix chamber 50 is shown in FIGS. 1 and 2. The mix chamber 50 is positioned below the mold assembly 12. The chamber 50, which is preferably made of metal components, includes a shell 52 having a base 54 and an upwardly extending shell wall 56. The base 54 includes an insert plug 57 held in position by threaded studs 58 and nuts 59. The shell 52 is supported by a mix chamber frame 60 that includes a shell support member 62 and a propeller support member 64. The frame 60 also includes a mold assembly support member 66. A flexible mold bottom liner 68 is positioned between the support member 66 and the body 16. The liner 68 is constructed of a durable plastic material similar to the liner 24 of the mold assembly 12.

Referring to FIG. 2, the base 54 of shell 52 includes at least one opening for passage of polyurethane chemicals to the interior of the shell. In the present embodiment, the base includes a first opening 70 for the passage of polyol and additives and a second opening 72 for the passage of isocyanate. A conduit 74 extends through the first opening 70. The conduit is in communication with a manifold 76. The manifold 76 channels the flow of polyol and additives, such as water, amine, silicone and tin, from a polyol conduit 78 and additive conduits 80A–D. The conduits 78 and 80A–D are in communication with polyol and additive sources (not shown). The polyol and additives are moved by pumps 82 and 84A–D, respectively.

A conduit 88 extends through the second opening 72. The conduit 88 is in communication with a valve 90. The valve 90 is in communication with a conduit 92 that is connected to an isocyanate source (not shown). The movement of the isocyanate is caused by a pump 94.

It should be understood that the liquid chemicals can be introduced from the bottom, as shown in the drawings, or from the top of the mix chamber 50, or introduced from the top and bottom depending on the application. As described in detail below, the chemicals can be introduced to the mix chamber in various ways to stratify the individual chemicals to prevent a detrimental reaction.

In the present embodiment, slow speed pumps (82 and 84A–D) are used to place the chemicals in the mix chamber 50 through the base 54 of the shell 52. Slow speed pumps are relatively inexpensive and thus make the overall apparatus less expensive to manufacture. The chemicals are pumped into the mix chamber 50 in a manner and sequence that, due to the specific weight differences among the chemicals, they stratify such that chemicals that react aggressively with each other are separated from each other by chemicals with which they do not react aggressively. This stratification separates the chemicals in a manner such that within the time it takes to pump all the chemicals into the mix chamber using slow pumps no significant chemical reactions occur in the chemicals. The stratification also allows the chemicals to rest in the mix chamber for a period of time without significant reaction.

Still referring to FIG. 2, the insert plug 57 of the base 54 includes an opening 96 through which extends a propeller shaft 98 connected at one end to a motor 100 and at the other end to a propeller 102. An O-ring 104 maintains proper alignment of the shaft 98 within the opening 96 and provides a fluid-tight seal. The shaft 98 is connected to the motor 100 by a coupling pin 106. The propeller 102 can include any number of blades 108, with two being preferred. It should be understood that various mixing devices can be used to mix the chemicals.

A bladder 110 covers at least a portion of the interior of the shell 52. In the present embodiment, the bladder 110 extends from the top edge 112 of the shell wall 56 to a bottom edge 114 in the shell base 54. The bladder 110 is secured to the shell 52 so that the space between the bladder 110 and the shell wall 56 is substantially fluid-tight. The bladder 110 is constructed of a durable plastic material similar to the liner 24 of the mold assembly 12.

A passageway 120 extends through one of the shell walls 56. A conduit 122 is in communication with the passageway 120. The conduit 122 is in communication with a 3-way valve 124 that regulates the flow of a fluid, such as air, from pumps 126 and 128. The pump 126 causes air to flow through conduit 122 and into the space between the bladder 110 and the shell wall 56. The pump 128 creates a vacuum thereby evacuating air from the space. The movement of air into and out of the space causes the bladder 110 to expand and contract accordingly during the molding process. As it will be readily apparent to one skilled in the art, the expansion and contraction of the bladder 110 can also be done mechanically. Further, the flexible plastic bladder 110 as shown in the drawings can be replaced by a relatively inflexible member in communication with a mechanical device that could force the chemicals from the mix chamber 50 to the mold assembly 12.

During the apparatus assembly process, the insert plug 57 is positioned in the base 54 over the bladder 110 that has been placed along edge 114. The nuts 59 are then threaded to studs 58 to affix the plug 57 to the shell support member 62. This forms a fluid-tight seal in the bottom of the bladder 110. The top of the bladder 110 is then folded over the edge 112 of the shell wall 56. The pump 128 is activated to provide a vacuum to the space defined by the bladder 110 and the wall 56. The vacuum holds the bladder 110 tightly against the shell 52 and away from the blades 108 of the propeller 102 during the mixing of the chemicals.

The shaft 98 of the propeller 102 is inserted through opening 96 and attached to the motor 100. The polyol/additive conduit 74 and the isocyanate conduit 88 are then inserted in first opening 70 and second opening 72, respectively. The shaft and conduits fit tightly within their respective openings to prevent leakage.

The mold bottom liner 68 is positioned on the upper surface of the support member 66 to form a fluid-tight seal with the bladder 110 at the edge 112 of the wall 56. The liner 24 of the mold assembly is then positioned in the interior of the body 16. Top and bottom portions of the liner 24 are folded to the exterior of the body 16 and fastened to the exterior by elastic members 30 and 32, respectively. The mold assembly 12 is then positioned on top of and affixed to the mix chamber 50 providing a fluid-tight seal. When so positioned, the top of the shell 52 is in direct communication with the interior of the mold assembly 12. The top cover 14 is placed on the mold assembly 12. A vacuum is then applied through the conduit 36 by the pump 34 to draw the liner 24 against the mold body 16.

During the molding process, polyol and additives are pumped into the mix chamber 50 through conduit 74 by pumps 82 and 84A–D through valve 76. Isocyanate is then pumped into the mix chamber 50 through conduit 88 by a pump 94 through valve 90. When all of the liquid chemicals are in the chamber 50, the motor 100 is activated to cause propeller 102 to rotate. The chemicals are then mixed through agitation by the propeller blades 108. After the mixing is complete, the motor is deactivated. The chemicals begin to rise from the mix chamber 50 into the mold assembly 12. At the time the mixing cycle is complete, the valve 124 is switched from the vacuum pump 128 to the positive pressure pump 126 by valve 124. This causes air to pass through the conduit 122 and into the space defined by the bladder 110 and the shell 52. As shown in FIG. 1, the expansion of the bladder 110 forces the expanding chemicals out of the mix chamber 50 and into the mold assembly 12 for final forming. The electrical control system that operates the pumps, valves, motor and counters are not shown. The system is known in the art and is standard for an apparatus of the type disclosed herein.

After curing of the formed article, the mold assembly is disassembled and the article is removed. The apparatus is then cleaned and reassembled as described above for subsequent molding operations.

EXPERIMENTAL DATA

Test formulas, physical properties and experimental data are set forth below.

| | TRIAL | |
|---|---|---|
| Chemical | Proportion | Specific weight |
| Polyol | 4.94 kg | 1.01 |
| Water | .20 kg | 1.00 |
| Amine catalyst | .01 kg | .87 |
| Silicone | .10 kg | 1.04 |
| Tin | .01 kg | 1.10 |
| Isocyanate | 2.42 kg | 1.22 |

Polyol= 3000 molecular weight polyether triol with a functionality of about 3.1.

Isocyanate= toluene diisocyanate (TDI) with an 80–20 ratio of 2,4 and 2,6 isomers.

All of the above proportions in the above chemical formula are by weight.

The specific weight listed for each chemical is the number that expresses the ratio between the weight of a given volume of listed substance and the weight of an equal volume of water.

EXAMPLE

The following example was produced in a cylindrically shaped mold that was 56 cm in diameter by 122 cm in height. The temperature of the mold was maintained at a constant 21° C.

About 1.36 kg of polyol listed in the formula of Trial is pumped into the mix chamber shell 52. All of the water, amine and silicone are then separately pumped into the shell 52. About 1.36 kg of polyol is then pumped into the shell 52. All of the tin is then pumped into the shell 52. The remaining polyol, about 2.22 kg, is then pumped into the shell 52. All of the isocyanate is then pumped into the shell 52. Due to the specific weights of the various chemicals, as stated above, they are stratified in layers in the mix chamber shell 52. This allowed the chemicals to be pumped into the shell 52 over a relatively long period of time. It also allowed the chemicals to rest within the shell 52 for a relatively long period of time without a detrimental reaction.

When the forming process began, the mix motor 100 was activated causing the propeller 102 to rotate at 600 rpm for approximately 15 seconds. The chemicals were completely mixed. The chemicals listed in the formula of Trial were selected and placed in the mix chamber 50 such that no detrimental reaction occurred among them before mixing and they were mixed in a manner that assured that the reaction age throughout the article was uniform as it was being formed.

After mixing, the chemicals expanded and rose through the top opening of the shell 52 and into the mold assembly 12. At the time the mixing stopped, the valve 124 applied approximately 1 kg/cm$^2$ positive pressure on the bladder 110. This caused the bladder 110 to expand and force the expanding chemicals out of the shell 52 and into the mold assembly 12. The expanding chemicals were formed into an article in the shape of the mold.

The chemicals were allowed to cure for 10 minutes in the mold assembly 12. The mold assembly was then disassembled and the finished article was removed. The apparatus 10 was then cleaned and reassembled for the next molding operation.

The above example produced an open cell flexible polyurethane article having a density of 0.68 kg/m$^3$. The core density was determined after the outer surface was removed from the molded article. The weight of the chemicals placed into the apparatus was sufficient to compensate for the high density of the removed outer surface and to compensate for the off-gassing that occurred during the chemical reaction.

It should be understood that variations of the chemicals listed in Trial, with the exception of water, are available in other specific weights. Further, chemicals that perform substantially the same function are available that react in different ways.

The above detailed description of the present invention is given for explanatory purposes. It will be apparent to those skilled in the art that numerous changes and modifications can be made in the example of the invention described above without departing from the scope of the invention. Accordingly, the whole of the foregoing description is to construed in an illustrative and not a limitative sense, the scope of the invention being defined solely by the appended claims.

I claim:

1. A method for the one-shot manufacture of articles made of polyurethane, which comprises the steps of:
    (a) selecting polyurethane chemicals from a group consisting of polyol, isocyanate and selected additives, each of said selected chemicals having a certain specific weight;
    (b) placing said chemicals into a mix chamber with water wherein said chemicals and water stratify in layers according to their specific weights to prevent detrimental reaction among said chemicals, wherein the water layer and the isocyanate layer are separated; and
    (c) mixing said chemicals and water to cause said chemicals to react and expand into a mold assembly to form an article.

2. The method of claim 1, wherein said mix chamber has a top and a bottom and said chemicals are placed in said mix chamber from said bottom of said mix chamber.

3. The method of claim 1, wherein said mix chamber has a top and a bottom and said chemicals are placed in said mix chamber from said top of said mix chamber.

4. A method for the one-shot manufacture of articles made of polyurethane which comprise the steps of:
    (a) selecting desired amounts of polyol, water, silicone and specified catalysts, all having known specific weights;

(b) selecting a desired amount of isocyanate having a known specific weight;

(c) placing the desired amounts of polyol, isocyanate, water, silicone and specified catalysts into a mix chamber in stratified layers to prevent detrimental reaction until mixing, wherein the water layer and isocyanate layer are separated;

(d) mixing the polyol, catalysts, water, silicone and isocyanate to create a polyurethane mix;

(e) expanding the polyurethane mix from the mix chamber to a mold cavity; and (f) removing the formed polyurethane article from the mold cavity.

5. The method of claim 4, wherein the polyol, catalysts, water, silicone and isocyanate are placed into the mix chamber from the bottom of the mix chamber.

6. The method of claim 4, wherein the polyol, catalysts, water, silicone and isocyanate are placed into the mix chamber from the top of the mix chamber.

7. The method of claim 4, wherein the step of expanding the polyurethane mix includes the application of fluid pressure to a flexible bladder member to expand and force the polyurethane mix from the mix chamber to the mold cavity.

8. The method of claim 4, wherein the step of expanding the polyurethane mix includes the application of fluid pressure to an expansible member to expand and force the polyurethane mix from the mix chamber to the mold cavity.

9. A method for the one-shot manufacture of articles made of polyurethane which comprises the steps of:

(a) selecting desired amounts of polyol, water, silicone and specified catalysts, all having known specific weights;

(b) selecting a desired amount of isocyanate having a known specific weight;

(c) selecting a mold chamber of predetermined shape;

(d) lining a mix chamber with a thin flexible liner smoothly engaged with the walls of the mix chamber;

(e) engaging the mix chamber with the mold chamber;

(f) placing the desired amounts of polyol, isocyanate, water, silicone and specified catalysts into the mix chamber in stratified layers to prevent detrimental reaction until mixing, wherein the water layer and isocyanate layer are separated;

(g) mixing the polyol, catalysts, water, silicone and isocyanate to create a polyurethane mix;

(h) expanding the polyurethane mix from the mix chamber to the mold chamber; and (i) removing the formed polyurethane article from the mold chamber.

10. The method of claim 9, wherein the polyol, catalysts, water, silicone and isocyanate are placed into the mix chamber from the bottom of the mix chamber.

11. The method of claim 9, wherein the polyol, catalysts, water, silicone and isocyanate are placed into the mix chamber from the top of the mix chamber.

12. The method of claim 9, wherein the step of expanding the polyurethane mix includes the application of fluid pressure to a flexible bladder member to expand and force the polyurethane mix from the mix chamber to the mold chamber.

13. The method of claim 9, wherein the step of expanding the polyurethane mix includes the application of fluid pressure to an expansible member to expand and force the polyurethane mix from the mix chamber to the mold chamber.

14. A method for the one-shot manufacture of articles made of polyurethane, which comprises the steps of:

(a) selecting polyurethane chemicals from a group consisting of polyol, isocyanate and selected additives, each of said selected chemicals having a certain specific weight;

(b) placing said chemicals into a mix chamber with water wherein said chemicals and water stratify in layers according to their specific weights to prevent detrimental reaction among said chemicals, wherein the water layer and the isocyanate layer are separated;

(c) mixing said chemicals and water to cause said chemicals to react and form a polyurethane mix; and (d) placing said polyurethane mix into a mold assembly to form a molded polyurethane article.

* * * * *